US007930461B2

(12) United States Patent
Tsuji

(10) Patent No.: US 7,930,461 B2
(45) Date of Patent: Apr. 19, 2011

(54) INTERFACE CIRCUIT

(75) Inventor: Takahiro Tsuji, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 628 days.

(21) Appl. No.: 12/022,915

(22) Filed: Jan. 30, 2008

(65) Prior Publication Data
US 2008/0215904 A1 Sep. 4, 2008

(30) Foreign Application Priority Data

Feb. 8, 2007 (JP) ................................ 2007-028943

(51) Int. Cl.
G06F 13/00 (2006.01)
G06F 13/10 (2006.01)
G06F 1/26 (2006.01)
(52) U.S. Cl. ..................... 710/305; 710/110; 713/340
(58) Field of Classification Search .................. 710/300, 710/104–107, 110, 305; 713/300–340
See application file for complete search history.

(56) References Cited

U.S. PATENT DOCUMENTS

| 5,938,770 | A  | * | 8/1999  | Kim ............................... 713/300 |
| 6,990,594 | B2 | * | 1/2006  | Kim ............................... 713/322 |
| 7,058,823 | B2 | * | 6/2006  | Lapidus ......................... 713/300 |
| 7,414,443 | B2 | * | 8/2008  | Jacobsson et al. ............. 327/116 |
| 7,446,615 | B2 | * | 11/2008 | Okuda ............................. 331/16 |
| 7,529,619 | B2 | * | 5/2009  | Lien ............................... 701/213 |
| 2004/0133722 | A1 | * | 7/2004  | Croyle et al. ................. 710/105 |
| 2004/0217653 | A1 | * | 11/2004 | Neidorff ......................... 307/80 |

FOREIGN PATENT DOCUMENTS

| JP | 2004-70621  | 3/2004 |
| JP | 2004-534995 | 11/2004 |
| JP | 2006-101291 | 4/2006 |

* cited by examiner

Primary Examiner — Glenn A Auve
Assistant Examiner — Trisha Vu
(74) Attorney, Agent, or Firm — Dickstein Shapiro LLP

(57) ABSTRACT

An interface circuit is disclosed.
When a USB-BUS power source voltage VBUS is not normally supplied to the substrate gates of PMOS transistors of switches of a first switching circuit which controls connecting a terminal D+/RXD to a terminal D−/TXD in an HS driver circuit, and to the substrate gates of PMOS transistors of switches of a second switching circuit which controls connecting the terminal D+/RXD to the terminal D−/TXD in an FS driver circuit 6; an amplified core circuit power source voltage DVDD is supplied to the substrate gates of the PMOS transistors. When the USB-BUS power source voltage VBUS is normally supplied to the substrate gates of the PMOS transistors, a USB stabilized power source voltage VUSB is supplied to the substrate gates of the PMOS transistors.

6 Claims, 5 Drawing Sheets

INTERFACE CIRCUIT

BACKGROUND OF THE INVENTION

1. Field of the Invention

The present invention generally relates to an interface circuit for data communications in which a communication port for USB (universal serial bus) communications is used in common with UART (universal asynchronous receiver transmitter) communications, and in particular, which has a power source switching circuit for switching power source voltages between a USB power source voltage and a core circuit power source voltage.

2. Description of the Related Art

Conventionally, there is a device in which a communication port for USB communications is used in common with UART communications. For example, Patent Document 1 discloses a communications adaptor. In the communications adaptor, by detecting a power source voltage for USB (VBUS), when the voltage is not detected, a switch is switched from a USB circuit to a UART circuit, and when the voltage is detected, the switch is again switched from the UART circuit to the USB circuit. In Patent Document 2, a communication interface for an electronic device is disclosed. In the electronic device, the switch is controlled by a microprocessor.

FIG. 3 is a diagram showing a conventional interface circuit. In FIG. 3, in an interface circuit 100, during USB communications, a power source voltage VBUS (not shown) is supplied and a USB stabilized power source voltage VUSB is generated. During UART communications, a battery power source voltage VBAT (not shown) is supplied and a core circuit power source voltage DVDD is generated from the battery power source voltage VBAT.

However, during the UART communications, the power source voltage VBUS is not supplied, and only the battery power source voltage VBAT and the core circuit power source voltage DVDD exist. Consequently, a reverse current must be studied from terminals D+/RXD and D−/TXD connected to a communication cable 107 to an HS (high speed) driver circuit 105 for high speed operations and an FS (full speed) driver circuit 106 for full speed operations in a USB interface circuit 102. In FIG. 3, the USB interface circuit 102 is directly connected to a UART interface circuit 103, the terminals D+/RXD and D−/TXD are directly connected to a switching circuit 111 of the HS driver circuit 105, and the terminals D+/RXD and D−/TXD are connected to a switching circuit 121 of the FS driver circuit 106 via resistors 128 and 129. Resistance values of the resistors 128 and 129 are, for example, 33Ω, respectively.

In FIG. 3, the description of elements except for the elements described above is omitted.

FIG. 4 is a diagram showing the switching circuit 111. As shown in FIG. 4, a switch SW103 provides a PMOS transistor 151 and an NMOS transistor 152 connected in parallel, and similarly, a switch SW104 provides a PMOS transistor 153 and an NMOS transistor 154 connected in parallel. The switching circuit 121 has a structure similar to that of the switching circuit 111.

FIG. 5 is a cut-away side view of the PMOS transistor 151 (153). In FIG. 5, when the USB stabilized power source voltage VUSB is not supplied, a current flows into the USB stabilized power source voltage VUSB via a forward route of a parasitic diode. In this case, a current over a designed value is consumed, and in some cases, signals during the UART communications cannot be normally transmitted and the UART communications cannot be executed due to a voltage drop due to the current flow.

Generally, the switching circuits 111 and 121 must be controlled by a power source voltage which is always applied to the circuits. However, when the communication circuit of the interface circuit does not have a host function, the USB power source voltage is supplied to the circuit via a cable. Since the cable is not always connected to the interface circuit 100, the switching circuits 111 and 121 cannot be controlled by using the power source voltage via the cable. Consequently, in a case of a mobile terminal, the mobile terminal uses a battery installed inside as the power source; however, the power source voltage largely fluctuates. When the power source voltage largely fluctuates, the fluctuation of the on-resistance value of the transistors in the switching circuits 111 and 121 becomes large. In order to control the fluctuation of the power source voltage within the USB standard, the sizes of the transistors must be large.

[Patent Document 1] Japanese Laid-Open Patent Application No. 2006-101291

[Patent Document 2] Japanese translations of PCT International No. 2004-534995 (WO2002/088973)

However, when the sizes of the transistors in the switching circuits 111 and 121 are large, the parasitic capacitance in the transistor becomes large; consequently, communication quality cannot be maintained, an area where the transistors are mounted becomes large, and the cost is increased.

SUMMARY OF THE INVENTION

In a preferred embodiment of the present invention, there is provided an interface circuit in which communication quality is maintained without increasing the transistor mounting area and the cost.

Features and advantages of the present invention are set forth in the description that follows, and in part will become apparent from the description and the accompanying drawings, or may be learned by practice of the invention according to the teachings provided in the description. Features and advantages of the present invention will be realized and attained by an interface circuit particularly pointed out in the specification in such full, clear, concise, and exact terms so as to enable a person having ordinary skill in the art to practice the invention.

To achieve one or more of these and other advantages, according to one aspect of the present invention, there is provided an interface circuit for data communications. The interface circuit includes a USB interface circuit which interfaces with an external device via a communication cable by using a pair of terminals connected to the communication cable during USB communications, a UART interface circuit which interfaces with another external device via the communication cable by using the pair of terminals connected to the communication cable during UART communications in common with the USB communications, and a power source switching circuit which detects a power source voltage supplied from an external unit during the USB communications, and outputs either a USB power source voltage generated from the power source voltage or a voltage proportional to a core circuit power source voltage which is used during the UART communications to the USB interface circuit based on the detected result. The USB interface circuit includes first and second switching circuits which connect the terminals during the USB communications, and a voltage from the power source switching circuit is input to the first and second switching circuits.

EFFECT OF THE INVENTION

According to an embodiment of the present invention, during USB communications, in a USB interface circuit of an interface circuit, a voltage from a power source switching circuit is input to first and second switching circuits which connect terminals to an external device via a communication cable. Therefore, during the USB communications, on-resistance values of transistors in the first and second switching circuits can be decreased while securing communication quality without making the mounting area of the transistors large and without increasing the cost. In addition, during UART communications, a voltage proportional to a core circuit power source voltage is input to the first and second switching circuits. Therefore, the power source voltage can be always secured in the first and second switching circuits and the communication quality can be maintained.

BRIEF DESCRIPTION OF THE DRAWINGS

Features and advantages of the present invention will become more apparent from the following detailed description when read in conjunction with the accompanying drawings, in which.

DESCRIPTION OF THE PREFERRED EMBODIMENT

Best Mode of Carrying Out the Invention

The best mode of carrying out the present invention is described with reference to the accompanying drawings.

Figure 1:
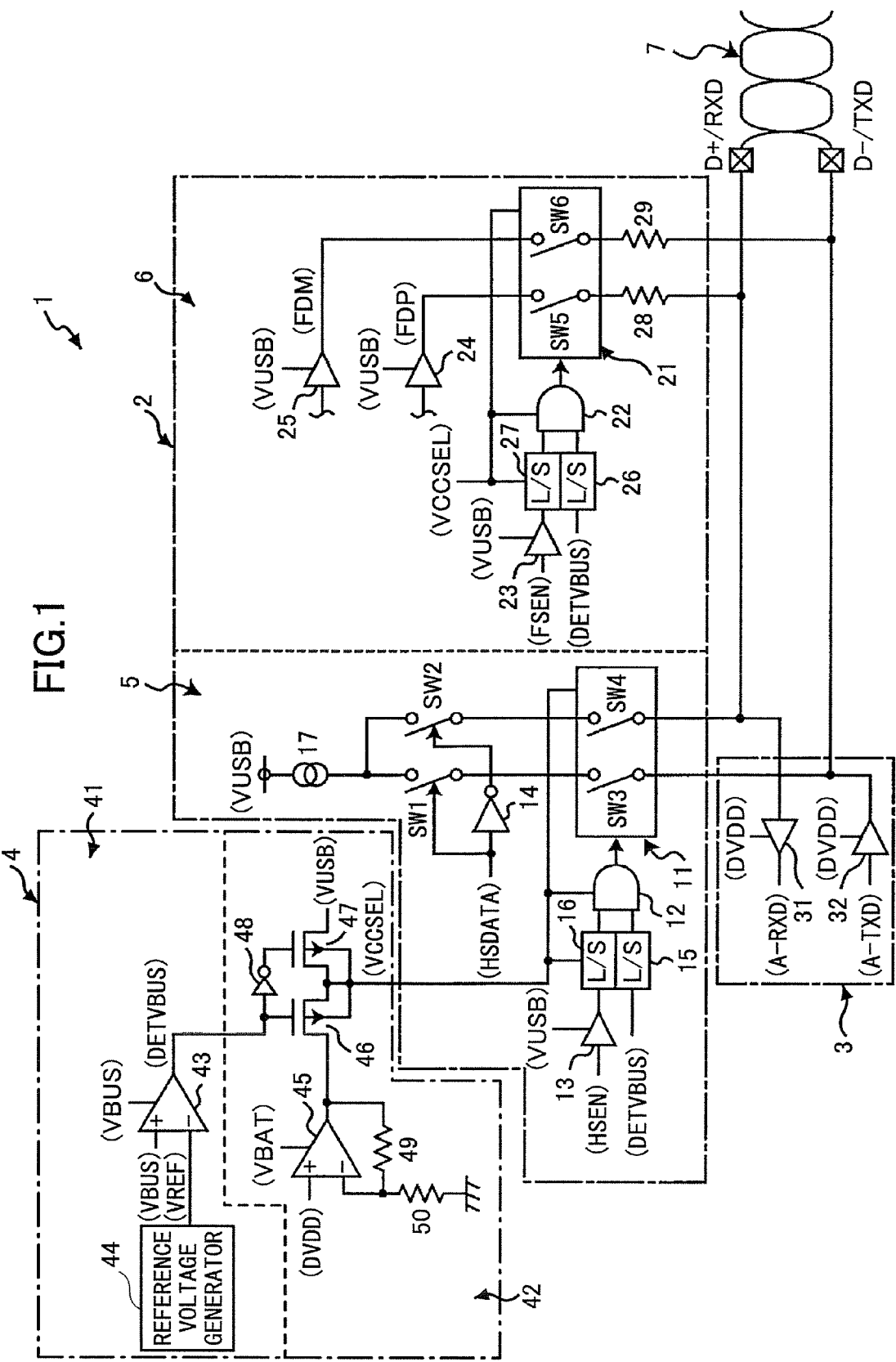
FIG. 1 is a diagram showing an interface circuit according to an embodiment of the present invention.

FIG. 1 is a diagram showing an interface circuit according to an embodiment of the present invention.

In FIG. 1, an interface circuit 1 is a circuit for data communications in which a communication port of USB communications is used in common with UART communications. The interface circuit 1 includes a USB interface circuit 2, a UART interface circuit 3, and a power source switching circuit 4 which switches a power source voltage to be supplied to the USB interface circuit 2. In FIG. 1, in the USB interface circuit 2, only a data transmitting circuit is shown and a data receiving circuit is omitted.

The USB interface circuit 2 includes an HS driver circuit 5 for high speed operations and an FS driver circuit 6 for full speed operations. The UART interface circuit 3, the HS driver circuit 5, and the FS circuit 6 are connected to a communication cable 7 via terminals D+/RXD and D−/TXD. The terminal D+/RXD is used as a D+terminal (non-inverting input and output terminal) during the USB communications, and is used as an RXD terminal (data input terminal) during the UART communications. In addition, the terminal D−/TXD is used as a D−terminal (inverting input and output terminal) during the USB communications, and is used as a TXD terminal (data output terminal) during the UART communications.

The HS driver circuit 5 includes a first switching circuit 11 (HS switching circuit), an AND circuit 12, a buffer 13, an inverter 14, L/Ss (level shift circuits) 15 and 16, a constant-current source 17, and switches SW1 and SW2. The FS driver circuit 6 includes a second switching circuit 21 (FS switching circuit), an AND circuit 22, buffers 23, 24, and 25, L/Ss 26 and 27, and resistors 28 and 29.

The second switching circuit 21 includes switches SW5 and SW6. The AND circuit 12 and the LSs 15 and 16 form an HS control circuit, and the AND circuit 22 and the L/Ss 26 and 27 form an FS control circuit.

The UART interface circuit 3 includes buffers 31 and 32. The power source switching circuit 4 includes a voltage detecting circuit 41 and a third switching circuit 42. The voltage detecting circuit 41 detects a USB-BUS power source voltage VBUS. The third switching circuit 42 switches a power source voltage to be supplied to the HS driver circuit 5 and the FS driver circuit 6 based on a result detected by the voltage detecting circuit 41. The voltage detecting circuit 41 includes an operational amplifier 43, and a reference voltage generator 44 which generates a predetermined reference voltage VREF and outputs the VREF. The third switching circuit 42 includes an operational amplifier 45, PMOS transistors 46 and 47, an inverter 48, and resistors 49 and 50.

As for the power source voltage during the USB communications, there are a battery power source voltage VBAT, a core circuit power source voltage DVDD generated from the battery power source voltage VBAT, a USB-BUS power source voltage VBUS input from an external unit, and a USB stabilized power source voltage VUSB generated from the USB-BUS power source voltage VBUS. For example, the battery power source voltage VBAT is approximately 3.8 V, the core circuit power source voltage DVDD is approximately 1.8 V, the USB-BUS power source voltage VBUS is approximately 5.0 V, and the USB stabilized power source voltage VUSB is approximately 3.3 V.

As for the power source voltage during the UART communications, there are the battery power source voltage VBAT and the core circuit power source voltage DVDD; and the USB-BUS power source voltage VBUS is not supplied. The USB stabilized power source voltage VUSB is only used for the USB interface circuit 2.

In the UART interface circuit 3, an input terminal of the buffer 31 is connected to the D+/RXD terminal, and a signal A-RXD which is input via the communication cable 7 is output from an output terminal of the buffer 31. A signal A-TXD to be output to the communication cable 7 is input to an input terminal of the buffer 32, and an output terminal of the buffer 32 is connected to the D−/TXD terminal. The buffers 31 and 32 are operated by the core circuit power source voltage DVDD.

In the power source switching circuit 4, the USB-BUS power source voltage VBUS is input to a non-inverting input terminal of the operational amplifier 43, and the predetermined reference voltage VREF is input to an inverting input terminal of the operational amplifier 43. A detection signal DETVBUS is output from an output terminal of the operational amplifier 43 which detection signal DETVBUS signifies whether the USB-BUS power source voltage VBUS is supplied to the non-inverting terminal of the operational amplifier 43.

In addition, the core circuit power source voltage DVDD is input to a non-inverting input terminal of the operational amplifier 45, and the resistors 49 and 50 are connected in series between an output terminal of the operational amplifier 45 and ground potential. An inverting input terminal of the operational amplifier 45 is connected to a connection point of the resistor 49 with the resistor 50, and the output terminal of the operational amplifier 45 is connected to the source of the PMOS transistor 46.

The USB stabilized power source voltage VUSB is input to the source of the PMOS transistor 47, the detection signal DETVBUS is input to the gate of the PMOS transistor 46, and a signal in which a signal level of the detection signal DETVBUS is inverted by the inverter 48 is input to the gate of the PMOS transistor 47. The drains of the PMOS transistors 46 and 47 are connected and a selector output voltage VCCSEL is output from the connection point of the drains. The operational amplifier 43 is operated by the USB-BUS power source voltage VBUS and the operational amplifier 45 is operated by the battery power source voltage VBAT.

In the HS driver circuit 5, one terminal of the switch SW1 and one terminal of the switch SW2 are connected at a connection point, the connection point is connected to an output terminal of the constant-current source 17, and an input terminal of the constant-current source 17 is connected to the USB stabilized power source voltage VUSB. The other terminal of the switch SW1 is connected to one terminal of the switch SW3, and the other terminal of the switch SW2 is connected to one terminal of the switch SW4. The other terminal of the switch SW3 is connected to the D−/TXD terminal, and the other terminal of the switch SW4 is connected to the D+/RXD terminal. A data signal HSDATA which is input for an HS mode is input to a control signal input terminal of the switch SW1, and the signal level of the data signal HSDATA is inverted by the inverter 14 and the inverted signal is input to a control signal input terminal of the switch SW2.

An HS enable signal HSEN which becomes a high level for the HS mode is input to an input terminal of the buffer 13, the level of a signal output from buffer 13 is shifted by the L/S 16, and the level shifted signal is input to one input terminal of the AND circuit 12. The level of the detection signal DETVBUS is shifted by the L/S 15, the level shifted signal is input to the other input terminal of the AND circuit 12, and a signal output from the AND circuit 12 is input to the first switching circuit 11 so as to control operations of the switches SW3 and SW4. The buffer 13 is operated by the USB stabilized power source voltage VUSB; and the first switching circuit 11, the AND circuit 12, and the L/Ss 15 and 16 are operated by the selector output voltage VCCSEL.

In the FS driver circuit 6, a data signal for an FS mode is input to an input terminal (not shown) of the buffer 24, and a data signal FDP is output from the buffer 24. In addition, a signal which inverts a level of a data signal at the FS mode is input to an input terminal (not shown) of the buffer 25, and a data signal FDM is output from the buffer 25. An output terminal of the buffer 24 is connected to one terminal of the switch SW5, and an output terminal of the buffer 25 is connected to one terminal of the switch SW6. The other terminal of the switch SW5 is connected to the D+/RXD terminal via the resistor 28, and the other terminal of the switch SW6 is connected to the D−/TXD terminal via the resistor 29. The resistance values of the resistors 28 and 29 are, for example, 33Ω, respectively.

An FS enable signal FSEN which becomes a high level for the FS mode is input to an input terminal of the buffer 23, the level of a signal output from buffer 23 is shifted by the L/S 27 and the level shifted signal is input to one input terminal of the AND circuit 22. The level of the detection signal DETVBUS is shifted by the L/S 26, the level shifted signal is input to the other input terminal of the AND circuit 22, and a signal output from the AND circuit 22 is input to the second switching circuit 21 so as to control operations of the switches SW5 and SW6. The buffer 23 is operated by the USB stabilized power source voltage VUSB, and the second switching circuit 21, the AND circuit 22, and the L/Ss 26 and 27 are operated by the selector output voltage VCCSEL.

The operational amplifier 43 compares the USB-BUS power source voltage VBUS with the reference voltage VREF. When the USB-BUS power source voltage VBUS is less than the reference voltage VREF, the operational amplifier 43 outputs the detection signal DETVBUS of a low level, and when the USB-BUS power source voltage VBUS is the reference voltage VREF or more, the operational amplifier 43 outputs the detection signal DETVBUS of a high level. That is, when the USB-BUS power source voltage VBUS is not supplied, the operational amplifier 43 outputs the detection signal DETVBUS of the low level, and when the USB-BUS power source voltage VBUS is normally supplied, the operational amplifier 43 outputs the detection signal DETVBUS of the high level.

The operational amplifier 45 and the resistors 49 and 50 form a non-inverting amplifying circuit, where the resistance value of the resister 49 is, for example, 1.5 MΩ, and the resistance value of the resister 50 is, for example, 1.8 MΩ. The operational amplifier 45 amplifies the core circuit power source voltage DVDD and outputs the amplified voltage. When the detection signal DETVBUS of the low level is output, the PMOS transistor 46 becomes ON (conductive) and the PMOS transistor 47 becomes OFF (non-conductive). Therefore, the voltage amplified by (output from) the operational amplifier 45 is output as the selector output voltage VCCSEL.

When the detection signal DETVBUS of the high level is output, the PMOS transistor 46 becomes OFF (non-conductive) and the PMOS transistor 47 becomes ON (conductive). Therefore, the USB stabilized power source voltage VUSB is output as the selector output voltage VCCSEL.

That is, when the USB-BUS power source voltage VBUS is not normally supplied, the third switching circuit 42 outputs the voltage amplified from the core circuit power source voltage DVDD as the selector output voltage VCCSEL, and when the USB-BUS power source voltage VBUS is normally supplied, the third switching circuit 42 outputs the USB stabilized power source voltage VUSB as the selector output voltage VCCSEL.

When the HS enable signal HSEN becomes the low level and/or the detection signal DETVBUS becomes the low level, the AND circuit 12 outputs a low level signal so that the switches SW3 and SW4 of the first switching circuit 11 become OFF (non-conductive). When the HS enable signal HSEN becomes the high level and the detection signal DETVBUS becomes the high level, the AND circuit 12 outputs a high level signal so that the switches SW3 and SW4 of the first switching circuit 11 become ON (conductive).

In addition, when the detection signal DETVBUS is the low level, the amplified core circuit power source voltage DVDD is input to the first switching circuit 11, the AND circuit 12, and the L/Ss 15 and 16 as the selector output voltage VCCSEL. When the detection signal DETVBUS is the high level, the USB stabilized power source voltage VUSB is input to the first switching circuit 11, the AND circuit 12, and the L/Ss 15 and 16 as the selector output voltage VCCSEL.

Figure 2:
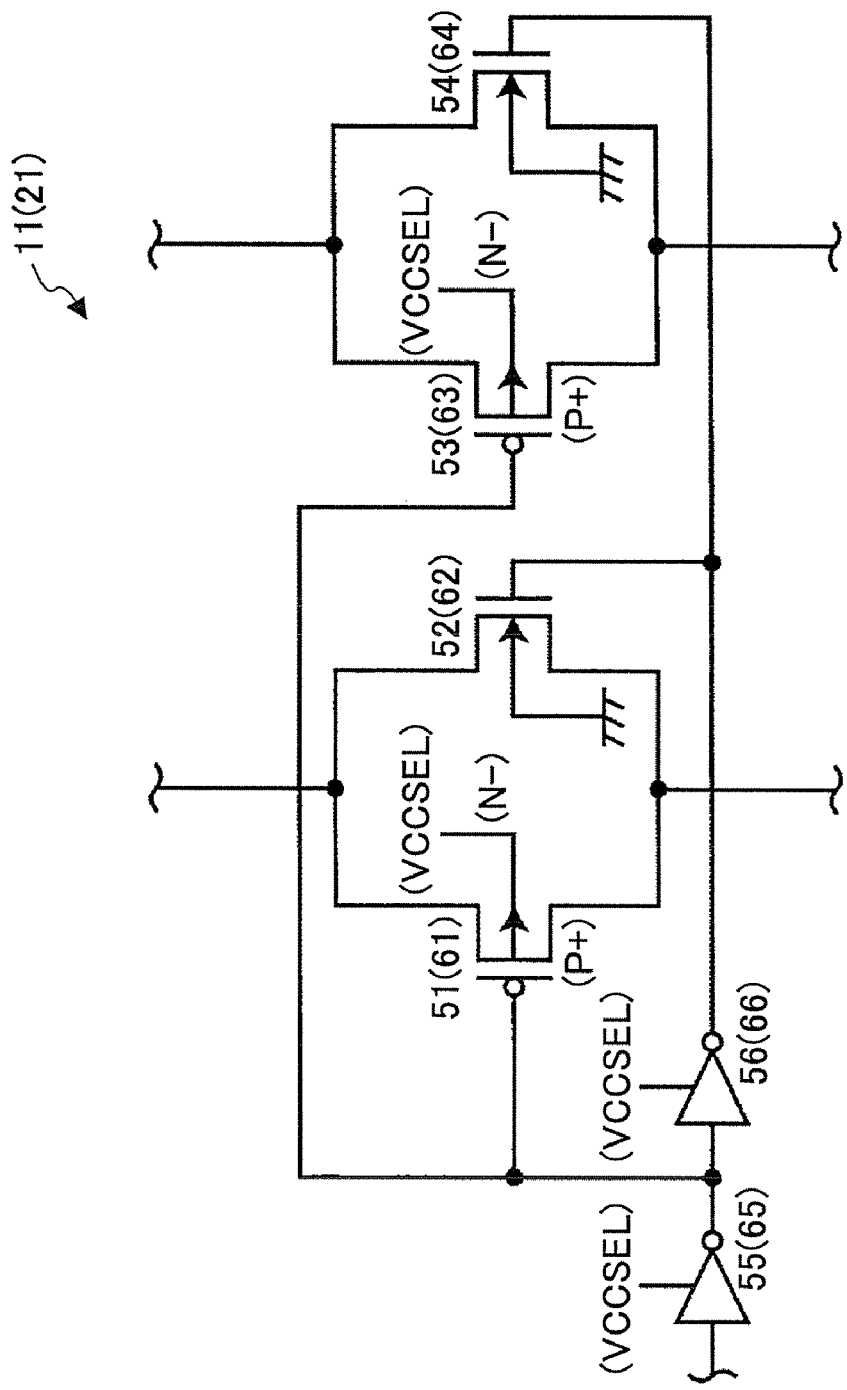
FIG. 2 is a circuit diagram of first and second switching circuits shown in FIG. 1.
Figure 3:
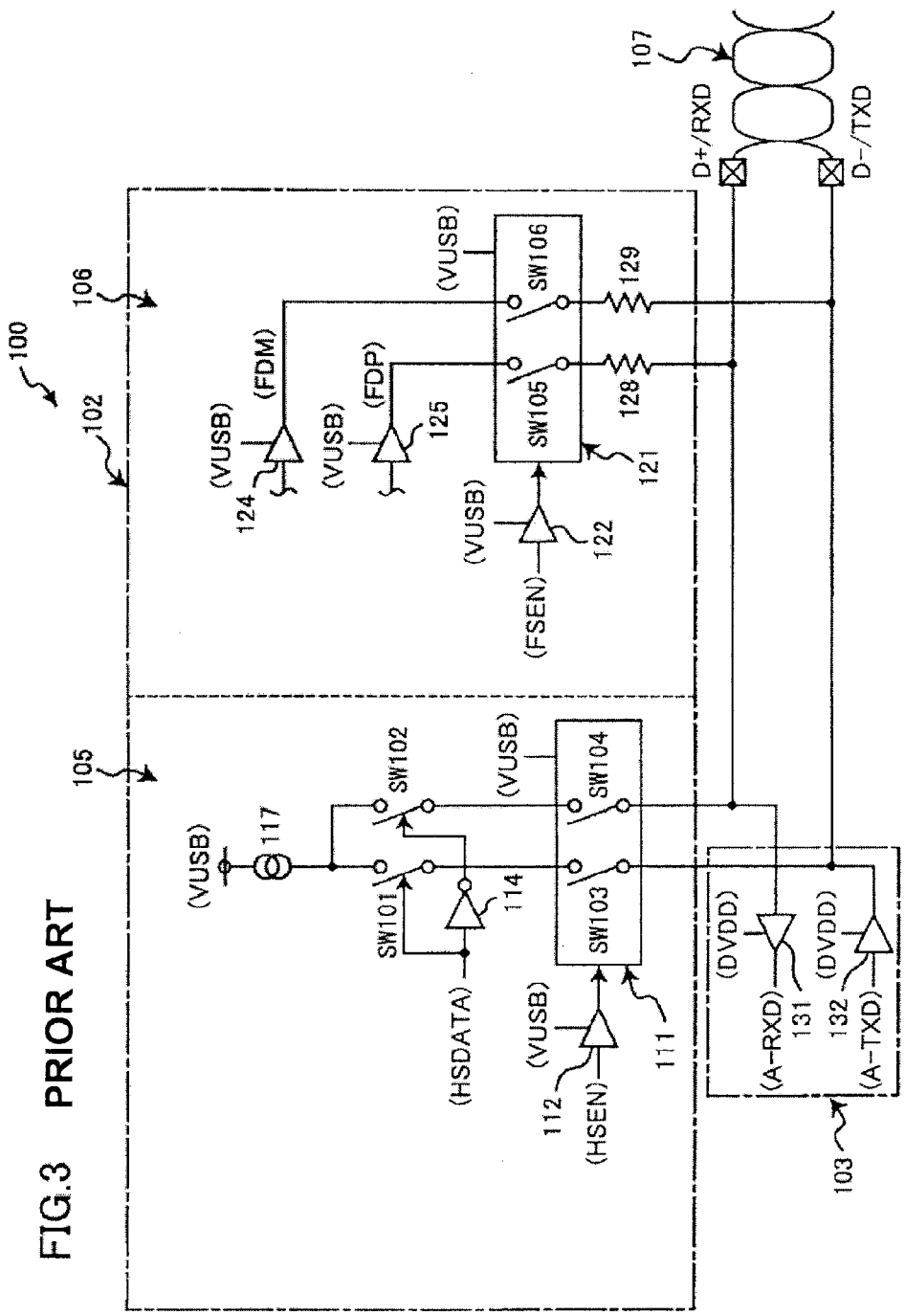
FIG. 3 is a diagram showing a conventional interface circuit.
Figure 4:
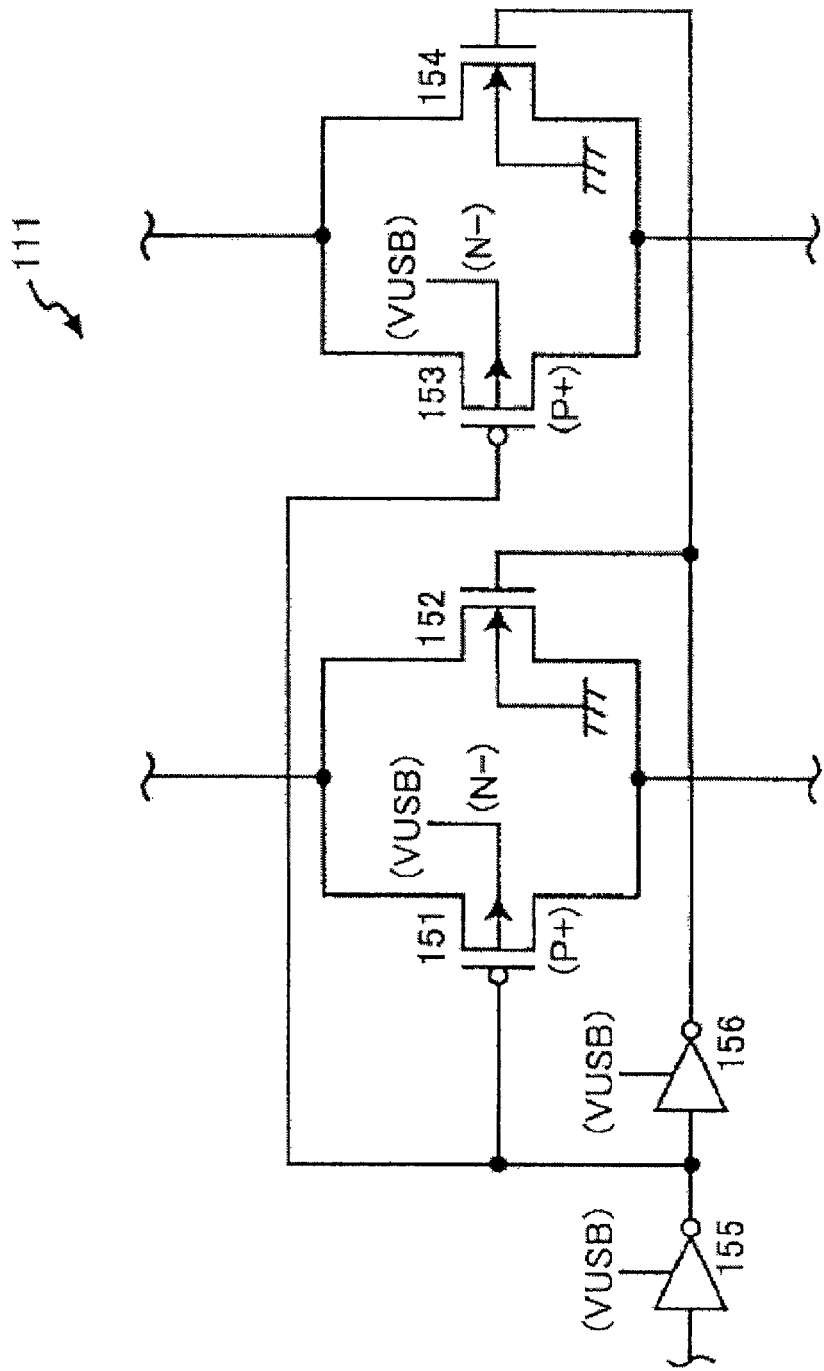
FIG. 4 is a diagram showing switching circuits shown in FIG. 3.
Figure 5:
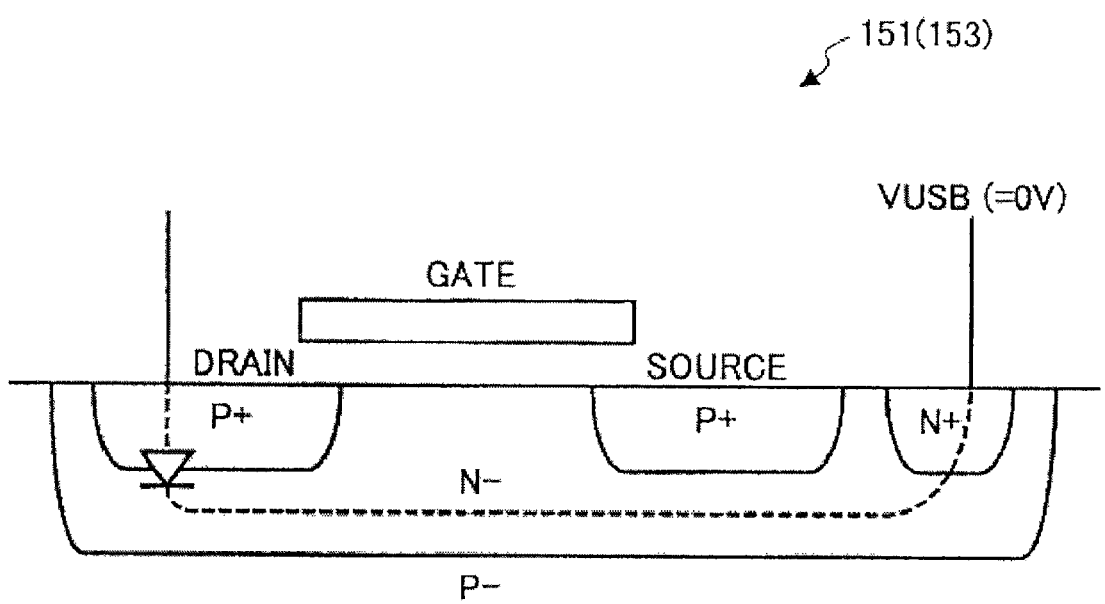
FIG. 5 is a cut-away side view of a PMOS transistor shown in FIG. 4.

FIG. 2 is a circuit diagram of the first switching circuit 11 (the second switching circuit 21). In FIG. 2, in a case of the second switching circuit 21, the reference number shows in parentheses.

In FIG. 2, the first switching circuit 11 includes PMOS transistors 51 and 53, NMOS transistors 52 and 54, and inverters 55 and 56. The switch SW3 is formed of the PMOS transistor 51 and the NMOS transistor 52 connected in parallel and the inverters 55 and 56. Similarly, the switch SW4 is formed of the PMOS transistor 53 and the NMOS transistor 54 connected in parallel and the inverters 55 and 56. A signal output from the AND circuit 12 is input to an input terminal of the inverter 55, and an output terminal of the inverter 55 is connected to an input terminal of the inverter 56 and the gates of the PMOS transistors 51 and 53.

An output terminal of the inverter 56 is connected to the gates of the NMOS transistors 52 and 54, and the inverters 55 and 56 are operated by the selector output voltage VCCSEL. The substrate gates of the PMOS transistors 51 and 53 are connected to the selector output voltage VCCSEL, and the substrate gates of the NMOS transistors 52 and 54 are connected to ground potential.

When the detection signal DETVBUS becomes the low level without the USB-BUS power source voltage VBUS being normally supplied, the amplified core circuit power source voltage DVDD is supplied to the substrate gates of the PMOS transistors 51 and 53 as the selector output voltage VCCSEL. When the detection signal DETVBUS becomes the high level with the USB-BUS power source voltage VBUS being normally supplied, the USB stabilized power source voltage VUSB is supplied to the substrate gates of the PMOS transistors 51 and 53 as the selector output voltage VCCSEL.

Therefore, when the USB-BUS power source voltage VBUS is not normally supplied and the detection signal DETVBUS becomes the low level and/or the HS enable signal HSEN becomes the low level, the switches SW3 and SW4 become OFF (non-conductive). At this time, a current does not flow into the selector output voltage VCCSEL from the terminals D+/RXD and D−/TXD via parasitic diodes of the PMOS transistors 51 and 53. Consequently, the communication quality can be maintained without making the sizes of the PMOS transistors 51 and 53 large.

In the above description, when the switch SW3 is replaced by the switch SW5, the switch SW4 is replaced by the switch SW6, the PMOS transistors 51 and 53 are replaced by corresponding PMOS transistors 61 and 63, the NMOS transistors 52 and 54 are replaced by corresponding NMOS transistors 62 and 64, the inverters 55 and 56 are replaced by corresponding inverters 65 and 66, the AND circuit 12 is replaced by the AND circuit 22, and the HS enable signal HSEN is replaced by the FS enable signal FSEN; the second switching circuit 21 is described.

As described above, according to the embodiment of the present invention, in the interface circuit 1, when the USB-BUS power source voltage VBUS is not normally supplied to the substrate gates of the PMOS transistors 51 and 53 of the corresponding switches SW3 and SW4 of the first switching circuit 11 which controls connecting the terminal D+/RXD to the terminal D−/TXD in the HS driver circuit 5, and when the USB-BUS power source voltage VBUS is not normally supplied to the substrate gates of the PMOS transistors 61 and 63 of the corresponding switches SW5 and SW6 of the second switching circuit 21 which controls connecting the terminal D+/RXD to the terminal D−/TXD in the FS driver circuit 6; the amplified core circuit power source voltage DVDD is supplied to the substrate gates of the PMOS transistors 51, 53, 61, and 63. When the USB-BUS power source voltage VBUS is normally supplied to the substrate gates of the PMOS transistors 51, 53, 61, and 63; the USB stabilized power source voltage VUSB is supplied to the substrate gates of the PMOS transistors 51, 53, 61, and 63. Therefore, even if the USB-BUS power source voltage VBUS is not normally supplied to the substrate gates of the PMOS transistors 51, 53, 61, and 63; a current can be prevented from flowing into the selector output voltage VCCSEL from the second and first switching circuits 11 and 21 which control connecting the terminal D+/RXD to the terminal D−/TXD. Consequently, the communication quality can be maintained without making the sizes of the PMOS transistors 51, 53, 61 and 63 large.

In the embodiment of the present invention, the amplified core circuit power source voltage DVDD is output as the selector output voltage VCCSEL; however, the core circuit power source voltage DVDD can be output as the selector output voltage VCCSEL.

Further, the present invention is not limited to the specifically disclosed embodiment, and variations and modifications may be made without departing from the scope of the present invention.

The present invention is based on Japanese Priority Patent Application No. 2007-028943, filed on Feb. 8, 2007, with the Japanese Patent Office, the entire contents of which are hereby incorporated herein by reference.

What is claimed is:

1. An interface circuit for data communications, comprising:
  a USB interface circuit which interfaces with an external device via a communication cable by using a pair of terminals connected to the communication cable during USB communications;
  a UART interface circuit which interfaces with another external device via the communication cable by using the pair of terminals connected to the communication cable during UART communications in common with the USB communications; and
  a power source switching circuit which detects a power source voltage supplied from an external unit during the USB communications, and outputs either a USB power source voltage generated from the power source voltage or a voltage proportional to a core circuit power source voltage used during the UART communications to the USB interface circuit based on the detected result; wherein
  the USB interface circuit includes first and second switching circuits which connect the terminals during the USB communications, and a voltage from the power source switching circuit is input to the first and second switching circuits.

2. The interface circuit for data communications as claimed in claim 1, wherein:
  each of the first and second switching circuits includes switches in each of which switch a PMOS transistor and an NMOS transistor are connected in parallel for connecting the terminals during the USB communications, and the voltage from the power source switching circuit is input to substrate gates of the PMOS transistors in the switches.

3. The interface circuit for data communications as claimed in claim 1, wherein:
  the power source switching circuit includes
  a voltage detecting circuit which detects the voltage supplied from the external unit during the USB communications and outputs the detected result; and
  a third switching circuit which outputs either the USB power source voltage or the voltage proportional to the core circuit power source voltage based on the detected result.

4. The interface circuit for data communications as claimed in claim 3, wherein:
  when a signal signifying that the value of the voltage supplied from the external unit is less than a predetermined value is output from the voltage detecting circuit as the detected result, the third switching circuit outputs the voltage proportional to the core circuit power source voltage to the USB interface circuit; and
  when a signal signifying that the value of the voltage supplied from the external unit is the predetermined value or more is output from the voltage detecting circuit as the detected result, the third switching circuit outputs the USB power source voltage to the USB interface circuit.

5. The interface circuit for data communications as claimed in claim 3, wherein:
  the USB interface circuit includes an HS driver circuit for high speed operations and an FS driver circuit for full speed operations;
  the HS driver circuit includes
  the first switching circuit as an HS switching circuit; and
  an HS control circuit which controls switching of the HS switching circuit based on a predetermined control signal for driving the HS driver circuit during the USB communications and the signal signifying the result detected by the voltage detecting circuit, and which is operated by a voltage input from the third switching circuit; and
  the FS driver circuit includes
  the second switching circuit as an FS switching circuit; and
  an FS control circuit, which controls switching of the FS switching circuit based on a predetermined control signal for driving the FS driver circuit during the USB communications and the signal signifying the result detected by the voltage detecting circuit, and which is operated by the voltage input from the third switching circuit.

6. The interface circuit for data communications as claimed in claim 3, wherein:
  the third switching circuit outputs either the USB power source voltage or a voltage in which the core circuit power source voltage is amplified to the USB interface circuit based on the result detected by the voltage detecting circuit.

* * * * *